Jan. 29, 1957  D. FIRTH  2,779,643
SHAFT MOUNTING
Filed May 20, 1953
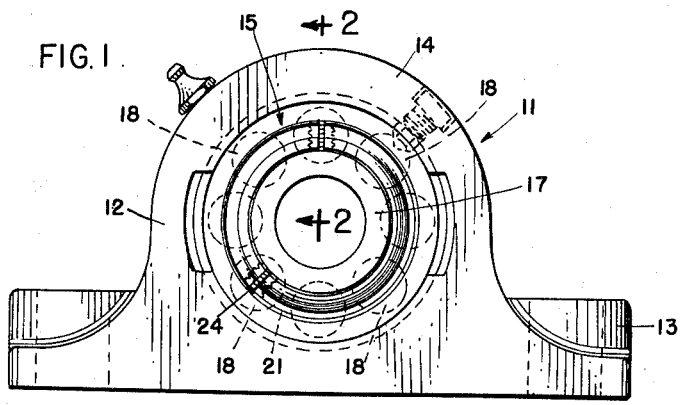
FIG. I.
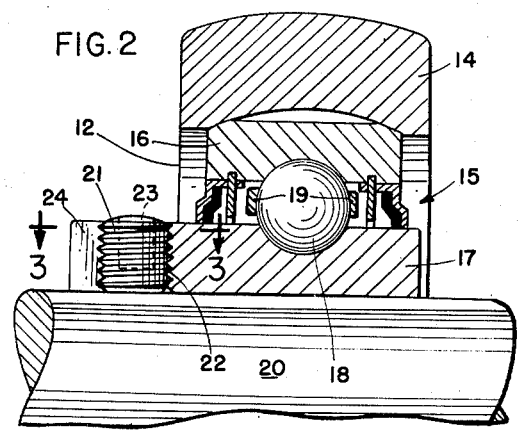
FIG. 2
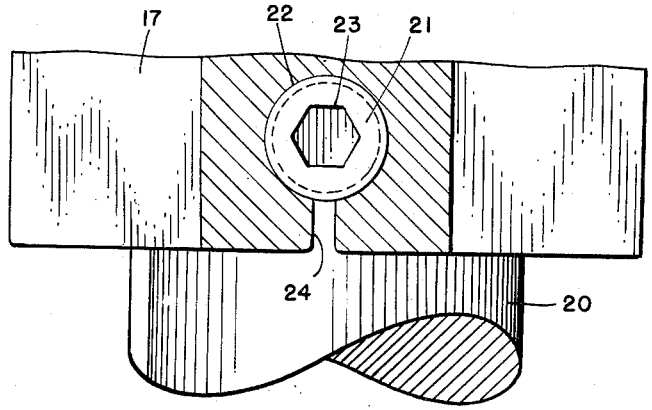
FIG. 3
*INVENTOR:—*
DAVID FIRTH
BY:—
Spencer, Johnston, Cook & Root
ATTORNEYS

2,779,643

SHAFT MOUNTING

David Firth, South Bend, Ind., assignor to Dodge Manufacturing Corporation, Mishawaka, Ind., a corporation of Indiana Application May 20, 1953, Serial No. 356,266

5 Claims. (Cl. 308—236)

The present invention relates, in general, to rotary shaft mountings, and has more particular reference to the attachment of shafts in turnable support sleeves, such as the sleeve-like inner shaft receiving member of a shaft supporting ball or roller bearing.

It is, of course, conventional to secure shafts in shaft receiving sleeves by means of fastening screws and other shaft engaging devices, mounted on the sleeve in position to engage and hold the shaft fast with the sleeve. Where screws, mounted in threaded openings or sockets in the sleeve, are employed for such purpose, it has been found that the screws tend to become loose, in the openings, and thereby release the shaft, in the support sleeve, as the result of rotational vibration, which always accompanies rotary shaft movement. Accordingly, it has heretofore been considered necessary to provide suitable screw anchoring devices, such as lock nuts, clamp rings and the like, to prevent shaft mounting screws from loosening in their sockets. Such screw anchoring devices not only add materially to the cost of the structure, but they also comprise additional parts, which may become lost or misplaced and which hence require the added attention of operating and service personnel.

An important object of the invention is to provide for securing a shaft in a supporting sleeve, by means of set screws, in fashion assuring against the loosening of the screws as the result of shaft rotation, but without resorting to lock nuts, clamp rings or other added anchoring devices; a further object being to provide a shaft mounting arrangement of extreme simplicity, having no auxiliary screw anchoring parts, but in which the inherent resilience of the shaft supporting sleeve is utilized to prevent shaft mounting set screws from becoming loose after the same have been tightened.

Another important object is to provide a shaft mounting bearing including an inner race member, formed as a sleeve sized to receive a shaft to be turnably supported, and fastening means comprising a pair of set screws circumferentially spaced apart in the sleeve in position to grippingly engage the surface of a shaft mounted in the sleeve, said sleeve being formed in such fashion as to apply the inherent resilience of its constituent material to resist loosening movement of the set screws therein, after the same have been adjusted to shaft gripping position.

Another important object of the invention is to provide for mounting a shaft in a supporting sleeve by disposing shaft engaging set screws in threaded openings formed in the sleeve, adjacent an end edge thereof, and to prevent loosening of the screws by end slitting the sleeve to form slots communicating with said threaded openings.

The foregoing and other important objects, advantages and inherent functions of the invention will become apparent as the same is more fully understood from the following description, which, taken with the accompanying drawings, discloses a preferred embodiment of the invention.

Referring to the drawings:

Fig. 1 is an end view of a bearing comprising a shaft mounting sleeve embodying the present invention; and Figs. 2 and 3 are sectional views taken substantially along the lines 2—2 and 3—3, respectively, in Figs. 1 and 2.

To illustrate the invention, the drawings show a shaft bearing 11 comprising a frame 12 having a base 13 for mounting the frame in any desired shaft supporting position. The frame may also comprise a circular portion 14 carried on the base 13 and within which may be mounted the elements of a roller bearing 15. The roller bearing 15 may comprise outer and inner race rings 16 and 17 and roller elements 18 disposed in suitable cage means 19 between the inner and outer race rings 16 and 17.

The outer ring 16 may be secured within the circular frame portion 14 in any suitable or preferred fashion, while the inner ring 17 is preferably elongated axially to form a sleeve sized to snugly receive and support a shaft 20 within the sleeve.

Heretofore, as shown more particularly in United States Patent No. 2,530,052, for Bearing Seal, which issued November 14, 1950, on the invention of David Firth, it has been conventional to employ a pair of circumferentially spaced set screws to clampingly secure a shaft within a sleeve such as the sleeve 17. As shown in the aforesaid patent, the shaft securing set screws may be applied in threaded openings formed in and through the shaft carrying sleeve adjacent an end thereof. Where the shaft carrying sleeve also serves as a race for roller bearing elements, it comprises specially hardened, relatively resilient and elastic steel, in which shaft fastening set screws tend to become loose as the result of shaft vibration when the shaft is rotated, especially when rotated at high speed. As a consequence, where set screws are employed directly in threaded openings in a shaft receiving sleeve, it has been heretofore considered necessary to provide clamp means upon the outwardly extending ends of the set screws in order to lock the same in shaft engaging position. A shaft supporting sleeve may also be secured on the shaft by applying an auxiliary circular clamping ring outwardly of the shaft sleeve, in position snugly embracing the same, and fastening the shaft to the sleeve by means of elongated set screws threadedly secured in openings formed in the clamping ring in position to engage the surface of the shaft, the set screws to such end extending freely through openings formed in the shaft sleeve, as shown in the patent aforesaid. Such auxiliary clamping ring may comprise relatively soft non-resilient steel, as compared with the material of which the race rings 16 and 17 are made, set screws exhibiting little if any tendency to loosen in such relatively soft material.

The present invention teaches how the shaft 20 may be secured in the hardened resilient steel sleeve 17, by means of set screws 21, threadedly engaged in openings 22 formed through the sleeve 17, preferably adjacent an end of said sleeve, without resort to lock nuts, clamp rings of soft steel, or other screw locking devices. In accordance with the present invention, the screws 21 are threaded in the sleeve in position with the axes of the screws extending radially in directions preferably subtending an angle of the order of 120 degrees, although the invention is, of course, not necessarily limited to any specific angular spacement of the axes of the set screws. The set screws may be provided with suitable means such as axial cavities 23 of non-circular sectional configuration to permit the same to be gripped by a tool in setting or releasing the same in the cavities 22.

In order to prevent the set screws from becoming loose in the cavities 22, the sleeve 17 is end slitted in order to form a slot 24 extending between the end edge of the sleeve 17 and each of the threaded set screw cavities 22, the slots 24 each extending in a plane including the longitudinal axis of the sleeve 17 and the axis of the cavity which the slot intersects.

When the circumferentially spaced set screws 21 are tightened upon the shaft, the sleeve 17 will be warped or distorted to some extent. The distortion which occurs in the sleeve 17 when the screws are tightened creates a tension which reacts as a twisting force upon the screw threads of the cavities 22. This force is of springy or yielding character and is exerted upon the threads of the set screws, in the set screw cavities 22, on opposite sides of the slits 24, and prevents the set screws from loosening, even when subjected to extreme vibration of the shaft when in operation. It has been found that shaft securing set screws, in a structure of the character described, unless provided with lock nuts or unless mounted in an auxiliary clamp ring, in manner as illustrated in the aforesaid United States Patent No. 2,530,052, will loosen rapidly if the sleeve 17 is not provided with end slots opening laterally upon the set screw cavities 22, in the manner described herein. While various expedients have in the past been employed to prevent shaft fastening screws from loosening in shaft mounting sleeves, such expedients have invariably entailed the incorporation of additional relatively expensive screw clamping or locking elements such as clamp collars, lock nuts and the like. The present invention, in employing simple, inexpensive end slits 24 in the sleeve 17, accomplishes the desired result at minimum cost.

It is thought that the invention and its numerous attendant advantages will be fully understood from the foregoing description, and it is obvious that changes may be made in the form, construction and arrangement of the several parts without departing from the spirit or scope of the invention or sacrificing any of its attendant advantages, the form herein disclosed being a preferred embodiment for the purpose of illustrating the invention.

The invention is claimed as follows:

1. A shaft mounting comprising a roller bearing embodying a sleeve of resilient material forming an inner roller bearing race, said sleeve being sized to slidingly receive a shaft to be mounted, said sleeve having circumferentially spaced cylindrical openings, formed inwardly of an end of said sleeve and threaded to receive set screws in said openings in position to engage a shaft extending in the sleeve, and an end slit connecting each of said openings with the adjacent end of said sleeve.

2. A shaft mounting comprising a roller bearing embodying a sleeve of resilient material forming an inner roller bearing race, said sleeve being sized to slidingly receive a shaft to be mounted, said sleeve having circumferentially spaced cylindrical openings, formed inwardly of an end of said sleeve and threaded to receive set screws in said openings in position to engage a shaft extending in the sleeve, and an end slit connecting each of said openings with the adjacent end of said sleeve, each end slit extending in a plane radially of the axis of the opening with which it connects.

3. A shaft mounting comprising a roller bearing embodying a sleeve of resilient material forming an inner roller bearing race, said sleeve benig sized to slidingly receive a shaft to be mounted, said sleeve having circumferentially spaced cylindrical openings, formed inwardly of an end of said sleeve and threaded to receive set screws in said openings in position to engage a shaft extending in the sleeve, and an end slit connecting each of said openings with the adjacent end of said sleeve, the axes of said openings extending radially of the longitudinal axis of the sleeve and subtending an angle of the order of 120° at said longitudinal axis.

4. A shaft mounting comprising a sleeve of resilient heat-hardened steel forming an inner roller bearing race sized to snugly receive therein a shaft to be mounted, an outer roller bearing race and roller elements therein for turnably supporting said sleeve as an inner bearing race, said sleeve having a pair of circumferentially spaced cylindrical openings, formed inwardly of an end of said sleeve and threaded to receive set screws in said openings in position to engage a shaft extending in the sleeve, and an end slit connecting each of said openings with the adjacent end of said sleeve whereby to yieldingly secure set screws against displacement from tightened shaft clamping position in said openings.

5. A shaft mounting comprising a roller bearing structure including an outer bearing race, a sleeve of resilient heat-hardened steel forming an inner bearing race sized to receive a shaft to be mounted, and roller elements disposed between and in rolling engagement with said inner and outer races, said sleeve having a pair of circumferentially spaced cylindrical openings formed inwardly of an end of said sleeve and threaded to receive set screws in said openings in position to engage a shaft extending in the sleeve, and an end slit connecting each of said openings with the adjacent end of said sleeve whereby to facilitate the warping of said end of the sleeve and the consequent resilient distortion thereof, at said openings, in response to tightening of set screws in said openings in a direction to grip a shaft in the sleeve, to thereby resiliently resist loosening of the screws in said openings.

References Cited in the file of this patent

UNITED STATES PATENTS

| | | |
|---|---|---|
| 143,849 | Sanford | Oct. 21, 1873 |
| 1,561,443 | Searles | Nov. 10, 1925 |
| 2,162,977 | Searles | June 20, 1939 |
| 2,553,337 | Shafer | May 15, 1951 |
| 2,568,162 | Mohns | Sept. 18, 1951 |
| 2,620,675 | Meadows et al. | Dec. 9, 1952 |

FOREIGN PATENTS

| | | |
|---|---|---|
| 6,496 | Great Britain | May 14, 1886 |
| 523,284 | France | Apr. 18, 1921 |